United States Patent
Jiang et al.

(10) Patent No.: US 9,240,822 B2
(45) Date of Patent: Jan. 19, 2016

(54) METHOD OF HANDLING POWER REDUCTION AT TRANSMITTER AND RELATED COMMUNICATION DEVICE

(75) Inventors: Jeng-Shiann Jiang, Tainan (TW); Heng-Chih Lin, Hsinchu (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 634 days.

(21) Appl. No.: 13/528,827

(22) Filed: Jun. 20, 2012

(65) Prior Publication Data
US 2013/0044828 A1 Feb. 21, 2013

Related U.S. Application Data

(60) Provisional application No. 61/523,414, filed on Aug. 15, 2011.

(51) Int. Cl.
| | |
|---|---|
| *H04B 1/10* | (2006.01) |
| *H04B 3/54* | (2006.01) |
| *H04B 1/719* | (2011.01) |
| *H04B 7/155* | (2006.01) |
| *H04L 25/02* | (2006.01) |
| *H04L 27/26* | (2006.01) |

(52) U.S. Cl.
CPC ............... *H04B 3/542* (2013.01); *H04B 1/719* (2013.01); *H04B 7/15521* (2013.01); *H04B 2203/5416* (2013.01); *H04B 2203/5495* (2013.01); *H04L 25/0226* (2013.01); *H04L 27/2602* (2013.01)

(58) Field of Classification Search
CPC ........... H04B 2203/5495; H04B 3/544; H04B 1/71632; H04B 1/719; H04B 1/71637; H04B 1/74
USPC .......................................................... 375/350
See application file for complete search history.

(56) References Cited

U.S. PATENT DOCUMENTS

| | | | | | |
|---|---|---|---|---|---|
| 6,608,828 | B1 * | 8/2003 | Balachandran | ....... | H03M 13/23 370/349 |
| 7,627,046 | B1 * | 12/2009 | Dick | ................... | H04L 27/2621 370/206 |
| 8,194,529 | B2 * | 6/2012 | Stadelmeier | .......... | H04L 5/0005 370/203 |
| 2001/0055320 | A1 * | 12/2001 | Pierzga | ............. | H03M 13/6356 370/480 |
| 2002/0154611 | A1 * | 10/2002 | Khullar | ................. | H04L 1/0003 370/329 |
| 2003/0031240 | A1 * | 2/2003 | Redfern | ................ | H04L 5/1438 375/222 |

(Continued)

OTHER PUBLICATIONS

M. K. Lee et al., HomePlug 1.0 powerline communication LANs-protocol description and performance results, International Journal of Communication Systems, Int. J. Commun. Syst. 2003, 2003 John Wiley & Sons, Ltd., Fig. 2.

(Continued)

*Primary Examiner* — Chieh M Fan
*Assistant Examiner* — Sarah Hassan
(74) *Attorney, Agent, or Firm* — Winston Hsu; Scott Margo (57) ABSTRACT

A method of arranging a frame for power reduction, utilized in a transmitter in a communication system is disclosed. The transmitter communicates with a receiver in the communication system. The method comprises generating a preamble with a first power level in the frame; arranging a header with the first power level after the preamble in the frame, wherein the header comprises information of a second power level; arranging an additional channel estimation (ACE) symbol with the second power level after the header in the frame; and arranging a first payload with the second power level after the ACE symbol in the frame.

21 Claims, 6 Drawing Sheets

(56) References Cited

U.S. PATENT DOCUMENTS

| | | | |
|---|---|---|---|
| 2003/0184433 A1 | 10/2003 | Zalitzky | |
| 2004/0028159 A1* | 2/2004 | Abdelilah | H04L 7/0062 375/350 |
| 2005/0147125 A1* | 7/2005 | Kim et al. | 370/471 |
| 2005/0265479 A1* | 12/2005 | Fujii | H04L 5/0023 375/303 |
| 2006/0146735 A1* | 7/2006 | Shaffer et al. | 370/260 |
| 2007/0060132 A1 | 3/2007 | Wilhelmsson | |
| 2007/0149237 A1 | 6/2007 | Russell | |
| 2008/0002655 A1 | 1/2008 | Logvinov | |
| 2008/0013497 A1 | 1/2008 | Belcea | |
| 2008/0137761 A1 | 6/2008 | Stadelmeier | |
| 2009/0296831 A1* | 12/2009 | Qi et al. | 375/259 |
| 2011/0164514 A1* | 7/2011 | Afkhamie et al. | 370/252 |
| 2011/0317723 A1* | 12/2011 | Abad Molina et al. | 370/475 |

OTHER PUBLICATIONS

HomePlug Power Alliance, HomePlug AV Draft Spec Version 2.n, Dec. 22, 2011, Chapter 3.

ITU-T, G.9960 Telecommunication (Jun. 2010) Standardization Sector of ITU Series G: Transmission Systems and Media, Digital Systems and Networks Access networks—In premises networks Unified high-speed wire-line based home networking transceivers—System architecture and physical layer specification, Chapter 7.

* cited by examiner

METHOD OF HANDLING POWER REDUCTION AT TRANSMITTER AND RELATED COMMUNICATION DEVICE

CROSS REFERENCE TO RELATED APPLICATIONS

This application claims the benefit of U.S. Provisional Application No. 61/523,414, filed on Aug. 15, 2011 and entitled "Method of throughput optimization via transmitter power reduction for power line communications", the contents of which are incorporated herein in their entirety.

BACKGROUND

The present invention relates to a method used in a communication system and related communication device, and more particularly, to a method of handling power reduction at a transmitter and related communication device.

A modern wireline communication system, such as an asymmetric digital subscriber line (ADSL) system or a power line communication (PLC) system, usually adopts orthogonal frequency-division multiplexing (OFDM) or discrete multi-tone modulation (DMT) for transmitting and receiving signals. That is, a transmitter processes the signals by using the OFDM or the DMT before transmitting the signals to a receiver. Correspondingly, the receiver recovers the transmitted information by demodulating the received OFDM signals or the received DMT signals. In detail, when the OFDM or the DMT operates, the transmitter allocates various numbers of bits to subcarriers according to a tone map (i.e., bit loading), to maximize throughput. In general, the tone map is determined by the receiver by performing channel estimation on the channel between the transmitter and the receiver, and then transmits or indicates the tone map to the transmitter.

On the other hand, power spectral density (PSD) mask specified for the PLC system (e.g. HomePlug AV2 or G.hn) is special in that power levels at a low band (i.e., <30 MHz) and a high band (i.e., 30~100 MHz) are greatly different. In detail, the power level at the low band is much higher than the power level at the high band. That is, when the signals are allocated to an entire band, part of the signals allocated to the low band can be transmitted with a high power level, while the other part of the signals allocated to the high band can only be transmitted with a low power level. When the receiver receives the signals at the entire band, the receiver needs to reduce the high power level of the part of the signals (i.e., the high power level at the low band), to operation region of an analog front end (AFE) of the receiver, such that the AFE can operate regularly. However, when reducing the high power level of the part of the signals, the power levels at the entire band are reduced at the same time. That is, the low power level of the other part of the signals is also reduced, such that the other part of the signals (i.e., the signals allocated to the high band) becomes weak and can not be easily recovered. Thus, reducing the power levels at the receiver is not an effective way to deal with strong signal which is generally encountered when the distance between the transmitter and receiver is short.

Therefore, the HomePlug AV2 and the G.hn both propose solutions for the power reduction, wherein the power levels are reduced at the transmitter, but not at the receiver. Notice that the power reduction is applied only to the low band portion according to the solutions proposed by the HomePlug AV2 and the G.hn. In detail, in the HomePlug AV2, reduced power levels are first determined by respective receivers, and are then transmitted to the transmitter. After the transmitter collects the reduced power levels transmitted from all the receivers, the transmitter determines a corresponding reduced power level for each receiver under a constraint that no additional hidden node is introduced. Then, the transmitter reduces a power level of a signal to the corresponding reduced power level, before transmitting the signal to the receiver. In other words, when determining the corresponding reduced power level for the receiver, the transmitter not only considers the reduced power level fed back by the receiver, but also considers the reduced power levels fed back by other receivers, to satisfy the constraint that no additional hidden node is introduced. Thus, the corresponding reduced power level is not optimal for the receiver. Besides, a large amount of time and resource required for collecting the reduced power levels from all the receivers makes this solution not efficient. On the other hand, in the G.hn, the transmitter only considers the reduced power level fed back by the receiver, when determining the corresponding reduced power level for the receiver. In this situation, additional hidden node may be introduced, since the transmitter transmits the signal with a weak power level to the receiver according to the corresponding reduced power level.

Therefore, the power reduction can not be solved completely according to the abovementioned solutions. How to solve the power reduction completely is a topic to be discussed.

SUMMARY

The present invention therefore provides a method and related communication device for handling power reduction at a transmitter to solve the abovementioned problems.

A method of arranging a frame for power reduction, utilized in a transmitter in a communication system is disclosed. The transmitter communicates with a receiver in the communication system. The method comprises generating a preamble with a first power level in the frame; arranging a header with the first power level after the preamble in the frame, wherein the header comprises information of a second power level; arranging an additional channel estimation (ACE) symbol with the second power level after the header in the frame; and arranging a first payload with the second power level after the ACE symbol in the frame.

A method of handling power reduction for a communication system is disclosed. The communication system comprises a transmitter and a receiver. The method comprises the receiver performing the power reduction according to a first power level comprised in a first frame, after receiving the first frame; the transmitter determining the first power level according to a second power level transmitted by the receiver; and the transmitter generating the first frame with a third power level and the first power level, and transmitting the first frame to the receiver.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
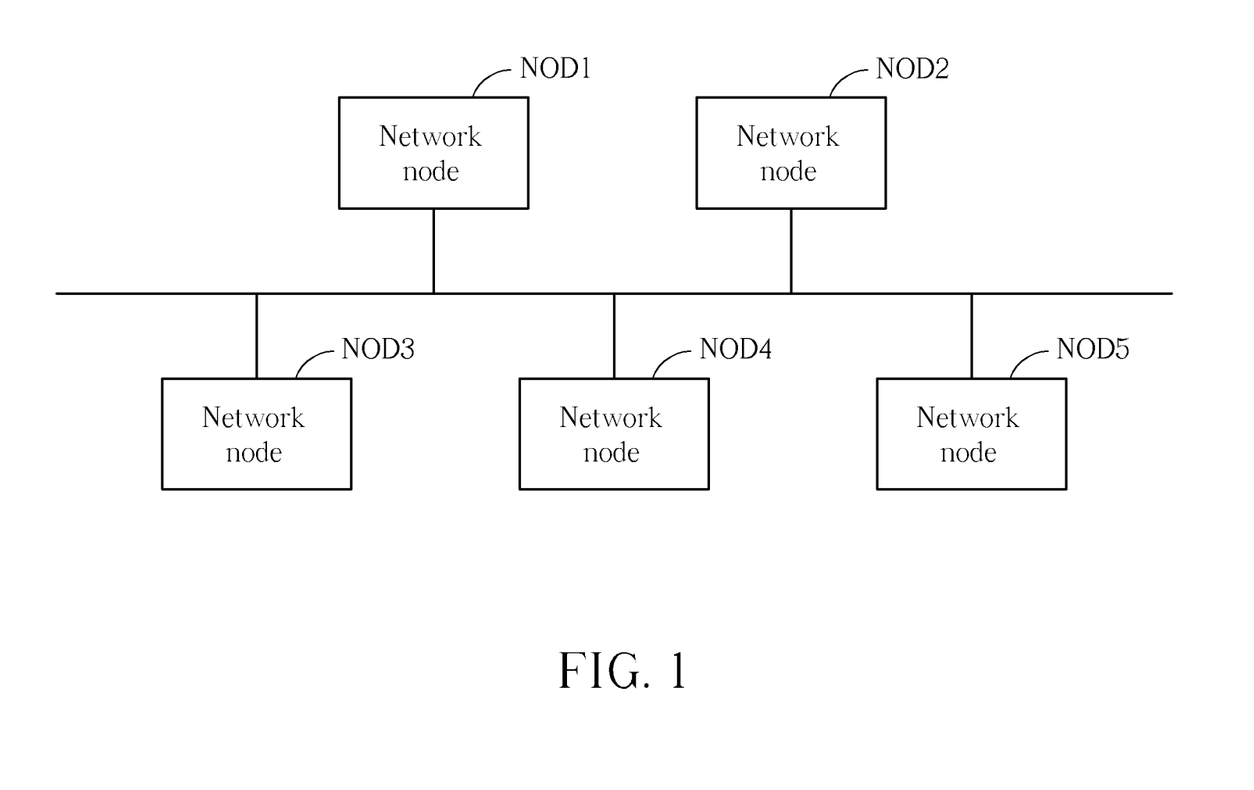
FIG. 1 is a schematic diagram of a communication system according to an example of the present invention.

Please refer to FIG. 1, which is a schematic diagram of a communication system 10 according to an example of the present invention. The communication system 10 is briefly composed of a plurality of network nodes NOD1-NOD5. In FIG. 1, the network nodes NOD1-NOD5 are simply utilized for illustrating a structure of the communication system 10. Practically, a network node can be referred to as a network equipment such as a server, a gateway, a router or a bridge. Alternatively, a network node can be mobile phones, laptops, tablet computers, electronic books, modems and portable computer systems. Further, a network node may communicate with another network node according to a communication standard such as HomePlug AV2, G.hn, or WiFi, and is not limited herein. When the communication standard is the HomePlug AV2 or the G.hn, the communication system 10 can be seen as a power line communication (PLC) system. Besides, a network node can be seen as a transmitter or a receiver according to transmission direction. For example, when the network node NOD1 transmits a signal to the network node NOD4, the network node NOD1 is the transmitter and the network node NOD4 is the receiver. Conversely, if the network node NOD4 replies the signal by transmitting a response to the network node NOD1, the network node NOD4 is the transmitter and the network node NOD1 is the receiver.

Figure 2:
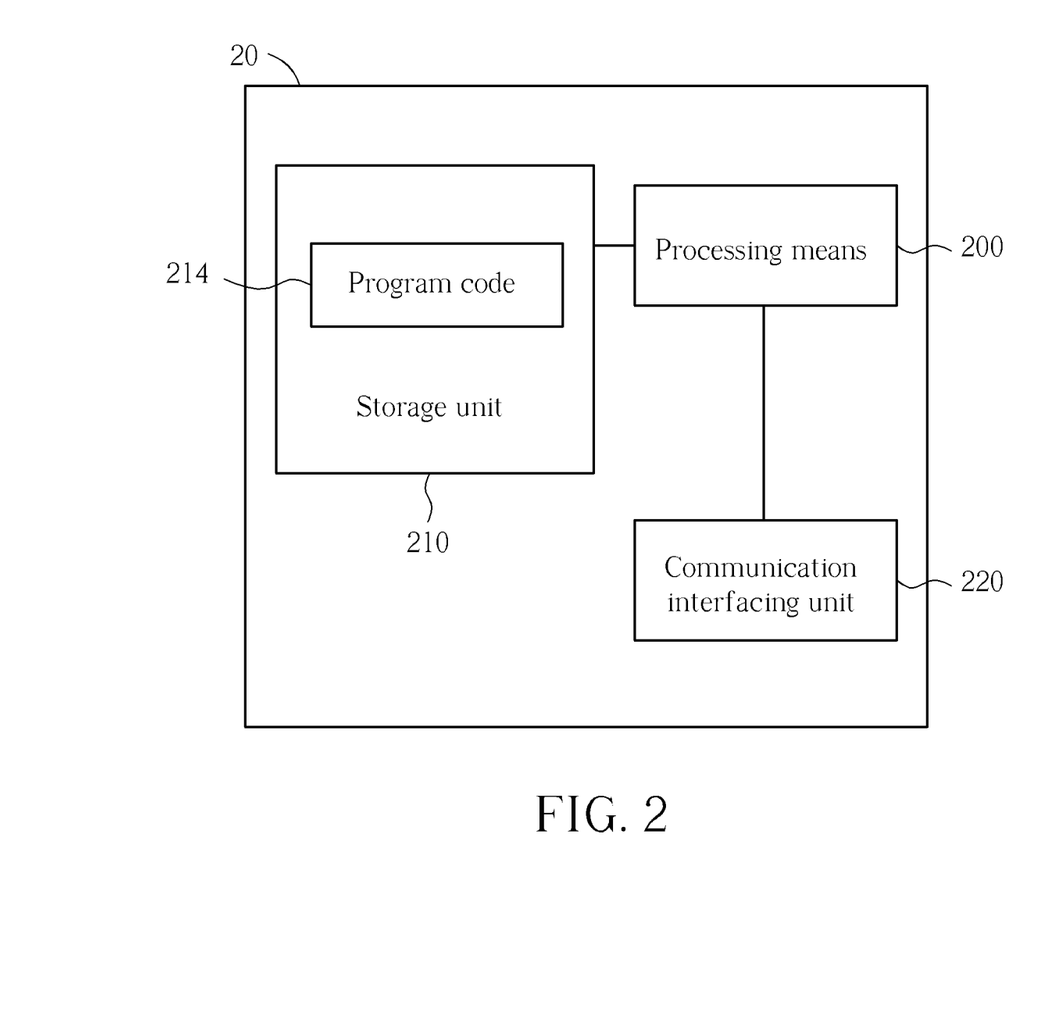
FIG. 2 is a schematic diagram of a communication device according to an example of the present invention.

Please refer to FIG. 2, which is a schematic diagram of a communication device 20 according to an example of the present invention. The communication device 20 can be a network node shown in FIG. 1, but is not limited herein. That is, the communication device 20 can be a transmitter, a receiver or both, i.e., the transmitter and the receiver are both installed in the network node. The communication device 20 may include a processing means 200 such as a microprocessor or an Application Specific Integrated Circuit (ASIC), a storage unit 210 and a communication interfacing unit 220. The storage unit 210 may be any data storage device that can store a program code 214, accessed by the processing means 200. Examples of the storage unit 210 include but are not limited to read-only memory (ROM), flash memory, random-access memory (RAM), CD-ROM/DVD-ROM, magnetic tape, hard disk, and optical data storage device. The communication interfacing unit 220 is preferably a transceiver, and can transmit/receive a signal according to processing results of the processing means 200.

Figure 3:
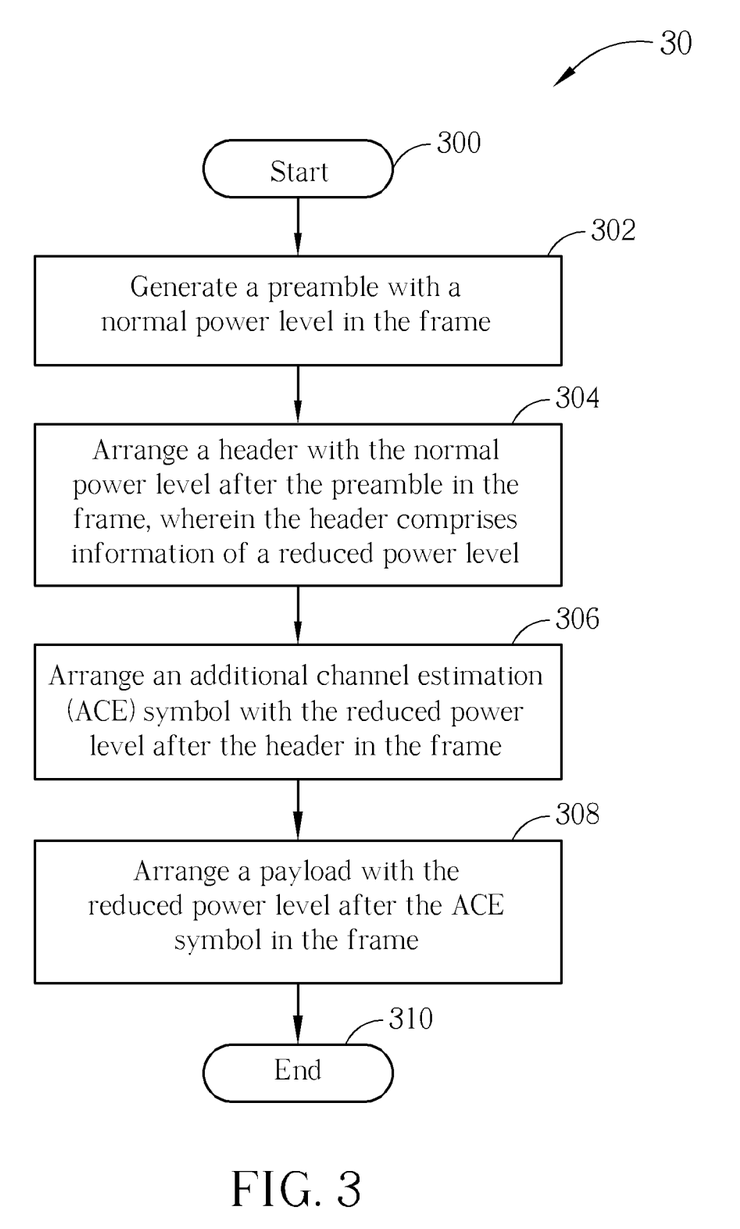
FIG. 3 is a flowchart of a process according to an example of the present invention.

Please refer to FIG. 3, which is a flowchart of a process 30 according to an example of the present invention. The process 30 is utilized in a transmitter in FIG. 1, for arranging a frame for power reduction, wherein the transmitter may be one of the network nodes NOD1-NOD5. The process 30 may be compiled into the program code 214 and includes the following steps:

Step 300: Start.

Step 302: Generate a preamble with a normal power level in the frame.

Step 304: Arrange a header with the normal power level after the preamble in the frame, wherein the header comprises information of a reduced power level.

Step 306: Arrange an additional channel estimation (ACE) symbol with the reduced power level after the header in the frame.

Step 308: Arrange a payload with the reduced power level after the ACE symbol in the frame.

Step 310: End.

According to the process 30, when a transmitter in the communication system 10 prepares to transmit a frame (i.e., a block, a packet, etc) to a receiver in the communication system 10, the transmitter generates fields of the frame with various power levels. In detail, the transmitter first generates a preamble with a normal power level (i.e., the step 302), and arranges a header with the normal power level after the preamble in the frame, wherein the header comprises information of a reduced power level (i.e., the step 304). Then, the transmitter arranges an additional channel estimation (ACE) symbol with the reduced power level after the header in the frame (i.e., the step 306), and arranges a payload with the reduced power level after the ACE symbol in the frame (i.e., the step 308). In other words, the power levels of the preamble and the header are the same, and are preferably larger than the power levels of the ACE symbol and the payload which are also the same. Therefore, other receivers can detect the preamble and the header easily due to the normal power level, and no hidden node is introduced. Besides, the ACE symbol and the payload can be easily processed by an analog front end (AFE) of the receiver due to the reduced power level. That is, an expensive AFE is not needed, and bit-loading of the payload allocated to a high band can be maximized since the power reduction is not additionally performed at the receiver. As a result, overall throughput of the receiver, i.e., the total throughput at low band and high band, is improved.

Figure 4:
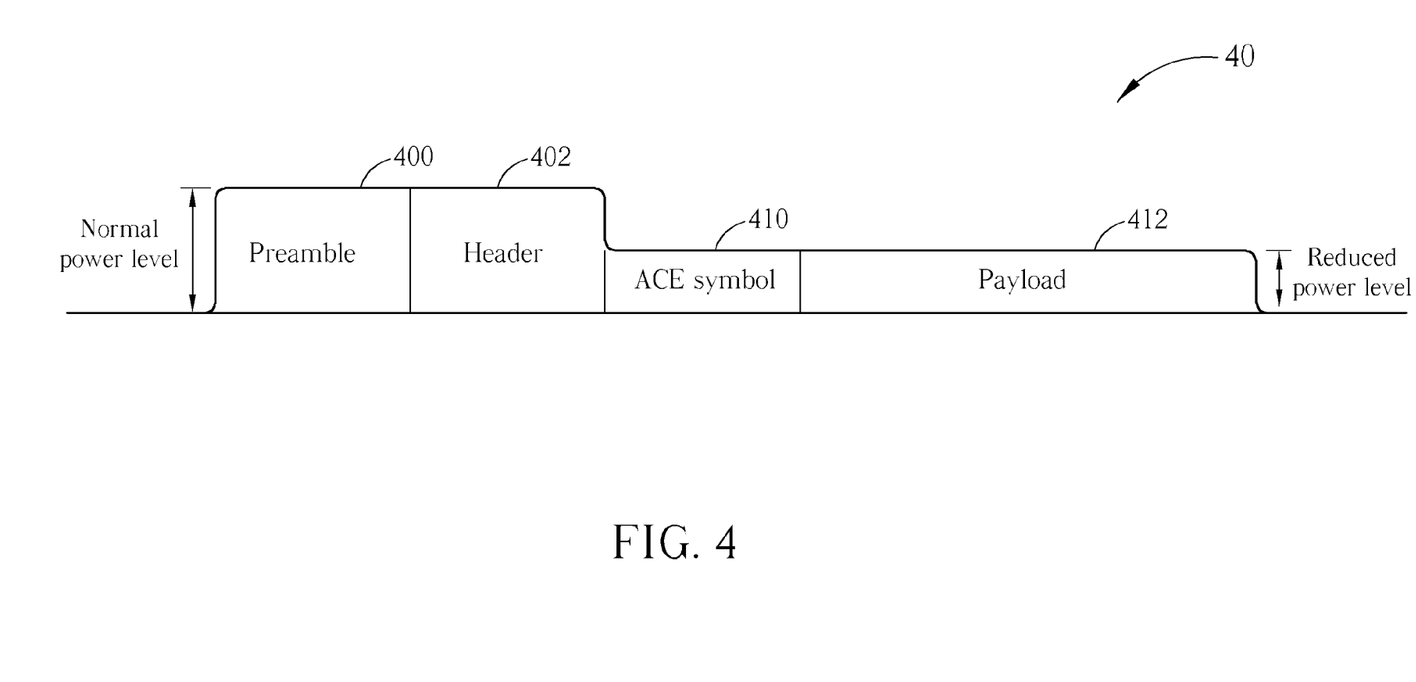
FIG. 4 is a schematic diagram of a frame for power reduction according to an example of the present invention.

Please note that, the above examples of the present invention show that a transmitter generates a frame including fields with various power levels for eliminating hidden nodes and improving signal quality at a high band, to improve throughput of a receiver. Realization of the present invention (e.g., the process 30) is not limited. For example, please refer to FIG. 4, which is a schematic diagram of a frame 40 for power reduction according to an example of the present invention. The frame 40 includes a preamble 400, a header 402, an ACE symbol 410 and a payload 412. The frame 40 is generated by a transmitter in FIG. 1, and is transmitted to a receiver in FIG. 1. As shown in FIG. 4, the preamble 400 and the header 402 are generated with a normal power level, and the ACE symbol 410 and the payload 412 are generated with a reduced power level, wherein information of the reduced power level is included in the header 402. In detail, after the receiver receives the preamble 400, the receiver performs a first automatic gain control (AGC) according to the normal power level of the preamble 400, for tuning power gain of the receiver to the normal power level, to process the header 402 with the normal power level. After the receiver obtains the information of the reduced power level from the header 402, the receiver can perform a second AGC according to the reduced power level, for tuning the power gain of the receiver to the reduced power level, to process the ACE symbol 410 and the payload 412 with the reduced power level. Besides, the receiver can perform channel estimation by using the ACE symbol 410, for obtaining an estimated channel which can be used for demodulating and decoding the payload 412. In detail, since the power levels of the ACE symbol 410 and the payload 412 are the same, channels experienced by the ACE symbol 410 and the payload 412, respectively, are nearly the same. Thus, the estimated channel obtained via the ACE symbol 410 is accurate and suitable for demodulating and decoding the payload 412.

Please note that, since the header 402 (and hence the information therein) may be encoded by using an error correcting code (e.g., turbo code, convolution code, etc.), the receiver must decode the header 402 before obtaining the information of the reduced power level. Thus, a latency is caused by decoding the header 402. If the receiver does nothing within the latency except decoding the header 402, throughput of the receiver can not be maximized.

Figure 5:
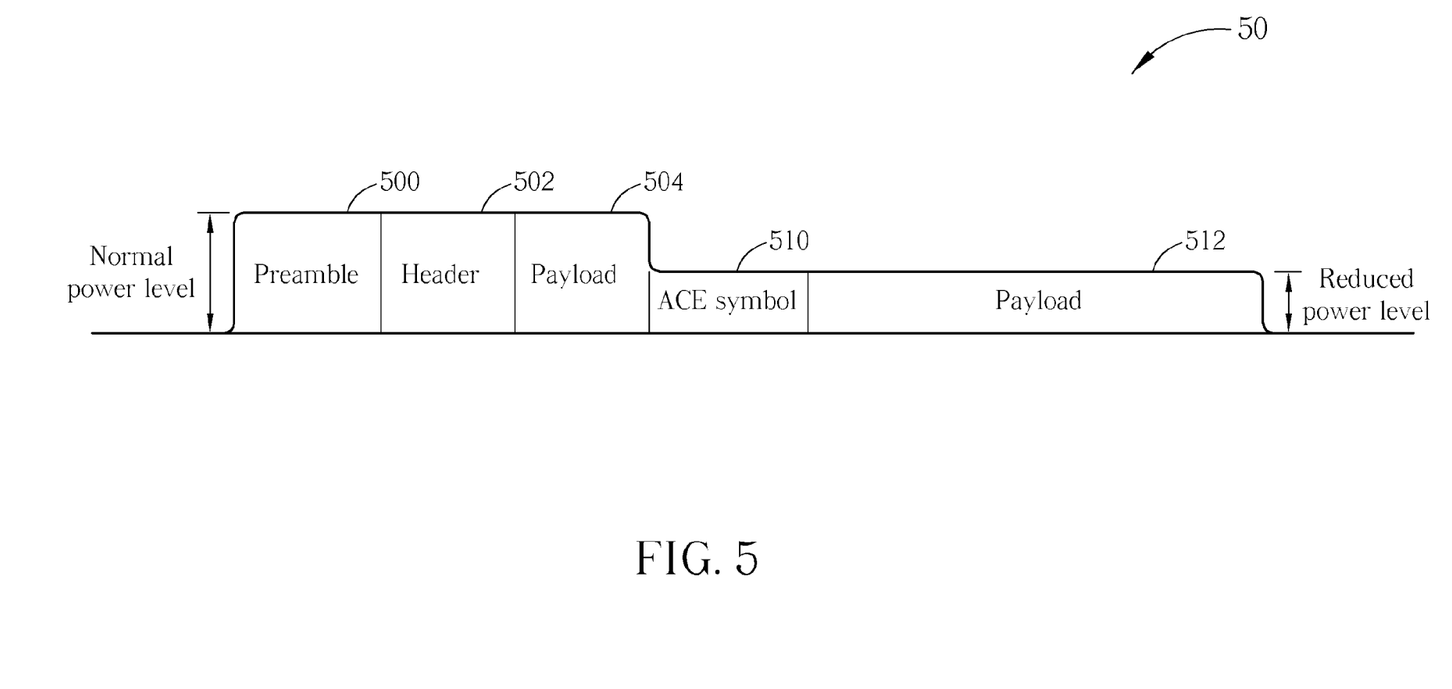
FIG. 5 is a schematic diagram of a frame for power reduction according to an example of the present invention.

For example, please refer to FIG. 5, which is a schematic diagram of a frame 50 for power reduction according to an example of the present invention. The frame 50 includes a preamble 500, a header 502, a payload 504, an ACE symbol 510 and a payload 512. The frame 50 is generated by a transmitter in FIG. 1, and is transmitted to a receiver in FIG. 1. As shown in FIG. 5, the preamble 500, the header 502 and the payload 504 are generated with a normal power level, and the ACE symbol 510 and the payload 512 are generated with a reduced power level, wherein information of the reduced power level is included in the header 502. The frame 50 is similar to the frame 40, except that the payload 504 is additionally generated and arranged between the header 502 and the ACE symbol 510. Since a latency is caused by decoding the header 502, the receiver can continue to receive the payload 504 within the latency, i.e., exploits the latency. Thus, throughput of the receiver is improved. Please note that, even though only one payload is arranged between the header 502 and the ACE symbol 510 in FIG. 5, a number of payloads arranged between the header 502 and the ACE symbol 510 can be determined according to capability of the receiver. For example, if the receiver can decode the header 502 fast, i.e., the latency is short, only one payload can be transmitted to and received by the receiver within the latency. Conversely, if the receiver decodes the header 502 slowly, i.e., the latency is long, more payloads (e.g., 2) can be transmitted to and received by the receiver within the latency. Functions of the preamble 500, the header 502, the ACE symbol 510 and the payload 512 are similar to functions of the preamble 400, the header 402, the ACE symbol 410 and the payload 412, respectively. Detail can be referred to the above description, and is not narrated herein.

Please note that, the frame 40 and the frame 50 mentioned above can be a probe frame (i.e., sounding packet) used at one or more initial transmissions, for negotiating parameters and performing measurements, or can be a normal frame (i.e., data packet) used in successive transmissions, for transmitting data or control information. Besides, sequences according to which the fields in the frame 40 and the frame 50 are generated are not limited to the above description, as long as the fields with corresponding power levels and positions can be generated. Furthermore, functions of the preamble (e.g., the preamble 400 or the preamble 500) are not limited to the first AGC. In general, the preamble at the beginning of the frame can be used for performing synchronization (e.g., time and/or frequency) and channel estimation. Information included in the header (e.g., the header 402 or the header 502) is not limited to the information of the reduced power level. In general, other control information and/or system information may also be included in the header. Besides, the ACE symbol (e.g., the ACE symbol 410 or the ACE symbol 510) may not be the only symbol for performing the channel estimation. If the frame (e.g., the frame 40 or the frame 50) is the probe frame, i.e., the payload (e.g., the payload 412 or the payload 512) is known by the receiver, channel estimation can be further performed by using the payload.

Figure 6:
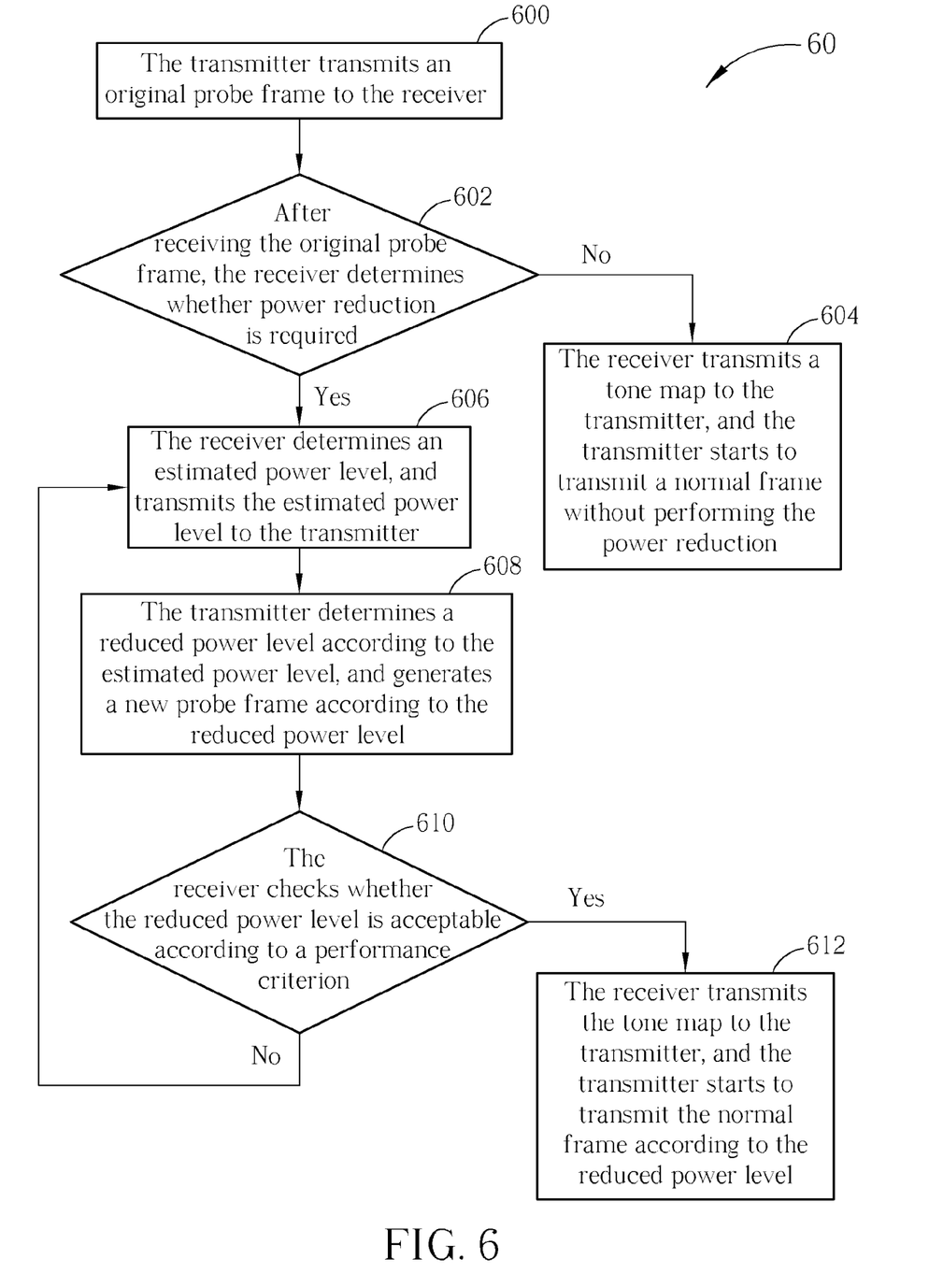
FIG. 6 is a flowchart of a process according to an example of the present invention.

Please refer to FIG. 6, which is a flowchart of a process 60 according to an example of the present invention. The process 60 is used for illustrating operations (e.g., interactions) of a transmitter and a receiver in the communication system 10, when the transmitter and the receiver communicate with each other by using one or more frames according to the frame mentioned above (e.g., the frame 40 or the frame 50). For example, the transmitter and the receiver can be the network nodes NOD3 and NOD5, respectively. According to the process 60, the transmitter transmits an original probe frame to the receiver at an initial transmission (i.e., beginning of the communication) (i.e., the step 600), wherein the original probe frame may include fields such as a preamble, a header and a payload (known by the receiver) all with a normal power level. After receiving the original probe frame, the receiver can determine whether power reduction is required by using the original probe frame (i.e., the step 602). That is, the preamble, the header and/or the payload can be used for evaluating whether the normal power level used by the transmitter is suitable (e.g., according to a performance criterion) for the receiver. For example, the performance criterion can be whether throughput of the receiver is optimized, or whether signal-to-noise ratio (SNR) is maximized. If the receiver determines that the power reduction is not required, i.e., the normal power level is suitable for the receiver, the receiver transmits a tone map to the transmitter, and the transmitter can start to transmit a normal frame (e.g., data packet) without performing the power reduction (i.e., the step 604). Please note that, the receiver can also determine that the power reduction is not required, if benefit of the power reduction is not significant, e.g., a length of the original probe frame is short (e.g., shorter than a predetermined threshold), or lengths of successive frames are short (e.g., shorter than a predetermined threshold). That is, overhead caused by the power reduction is considered large after taking the length of the frame into consideration. Conversely, if the receiver determines that the power reduction is required, i.e., the normal power level is not satisfied by the receiver, the receiver determines an estimated power level, and transmits the estimated power level to the transmitter (i.e., the step 606). For example, the receiver can determine the estimated power level by using the preamble, the header and/or the payload according to the performance criterion exemplified above.

After receiving the estimated power level, the transmitter determines a reduced power level according to the estimated power level transmitted by the receiver, and generates a new probe frame according to the reduced power level (i.e., the step 608). In other words, the transmitter can directly set the reduced power level equal to the estimated power level, i.e., the transmitter considers the estimated power level proper or the transmitter is configured to accept the estimated power level. Alternatively, the transmitter can determine the reduced power level, after considering the estimated power level and other factors, e.g., estimated power levels fed back by other receivers. Please note that, the new probe frame can be generated according to the frame 40. That is, the new probe frame includes a preamble and a header with the normal power level, and an ACE symbol and a payload with the reduced power level. Alternatively, the new probe frame can be generated according to the frame 50. That is, the new probe frame includes a preamble, a header and a first payload with the normal power level, and an ACE symbol and a second payload with the reduced power level. Functions of the fields in the new probe frame (e.g., according to the frame 40 or the frame 50) can be referred to the above description, and are not narrated herein. After the transmitter transmits the new probe frame to the receiver, the receiver checks (i.e., confirms) whether the reduced power level used in the new probe frame is acceptable according to a performance criterion, which can be the same as the performance criterion used in the step 602, and is not limited. If the receiver accepts the reduced power level, the receiver transmits the tone map to the transmitter, and the transmitter starts to transmit the normal frame according to the reduced power level (i.e., the step 612). Otherwise, the receiver goes back to the step 606 again, for notifying the transmitter to adjust (i.e., modify) the reduced power level.

Please note that, the receiver transmits the estimated power level to the transmitter in the above description, for indicating the transmitter to configure the reduced power level equal to the estimated power level. However, the receiver can also transmit a power difference to the transmitter, for indicating the transmitter that the reduced power level should be smaller than the normal power level by the power difference. For example, the normal power level is 60 dB, the transmitter knows that the reduced power level suggested by the receiver is 50 dB after receiving the power difference of 10 dB transmitted by the receiver. Similarly, information included in the header (e.g., the header 402 or the header 502) can also be the power difference between the normal power level and the reduced power level, and is not narrated herein.

The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method for handling power reduction at a transmitter when the transmitter communicates with a receiver. According to the present invention, when the transmitter transmits a frame to the receiver, fields of the frame are generated with various power levels including a normal power level and a reduced power level. Therefore, other receivers can detect the frame easily due to the fields with the normal power level, and no hidden node is introduced. Besides, the fields with the reduced power level can be easily processed by an AFE of the receiver. That is, an expensive AFE is not needed, and part of the frame allocated to a high band can be easily recovered since the power reduction is not additionally performed at the receiver. As a result, throughput of the receiver is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of arranging a frame for power reduction, utilized in a transmitter in a communication system, the transmitter communicating with a receiver in the communication system, the method comprising:
    generating a preamble with a first power level in the frame;
    arranging a header with the first power level after the preamble in the frame, wherein the header comprises information of a second power level and the header does not comprise any preamble information;
    arranging an additional channel estimation (ACE) symbol with the second power level after the header in the frame; and
    arranging a first payload with the second power level after the ACE symbol in the frame.

2. The method of claim 1, wherein the receiver performs channel estimation according to the ACE symbol.

3. The method of claim 1, further comprising:
    arranging at least one second payload with the first power level between the header and the ACE symbol in the frame.

4. The method of claim 3, wherein a number of the at least one second payload is related to capability of the receiver.

5. The method of claim 1, wherein the first power level is larger than the second power level.

6. The method of claim 1, wherein the communication system is a power line communication system.

7. A transmitter in a communication system, comprising: a storage unit that stores a program code; a processing means for executing the program code to perform the method of claim 1; a communication interface unit for transmitting the frame.

8. A method of handling power reduction for a transmitter, the method comprising:
    the transmitter determining a first power level according to a second power level transmitted by a receiver; and
    the transmitter generating the first frame with a third power level and the first power level, and transmitting the first frame to the receiver;
    wherein the step of the transmitter generating the first frame with the third power level and the first power level comprises generating a preamble with the third power level before a header in the first frame; and:
    arranging the header with the third power level, wherein the header comprises information of the first power level and the header does not comprise any preamble information.

9. The method of claim 8, wherein generating the first frame with the third power level and the first power level further comprises:
    arranging an additional channel estimation (ACE) symbol with the first power level after the header in the first frame; and
    arranging a first payload with the first power level after the ACE symbol in the first frame.

10. The method of claim 9, further comprising:
    arranging at least one second payload with the third power level between the header and the ACE symbol in the first frame.

11. The method of claim 10, wherein a number of the at least one second payload is related to capability of the receiver.

12. The method of claim 8, the method further comprises:
    generating the first frame with the third power level, if a length of the first frame is shorter than a predetermined threshold.

13. The method of claim 8, wherein determining the first power level according to the second power level transmitted by the receiver comprises:
    configuring the first power level equal to the second power level transmitted by the receiver.

14. The method of claim 8, wherein the third power level is larger than the first power level.

15. A method of handling power reduction for a receiver, the method comprising:
    tuning a power gain of the receiver to a first power level;
    processing a header of a first frame transmitted by a transmitter with the first power level, to obtain information of a second power level from the header, wherein the header comprises the information of the second power level and does not comprise any preamble information;
    tuning the power gain of the receiver to the second power level according to the information of the second power level;

processing an additional channel estimation (ACE) symbol and a payload of the first frame with the second power level.

16. The method of claim 15, further comprising: wherein the receiver performs channel estimation according to the ACE symbol.

17. The method of claim 15, further comprising:
the receiver determining a third power level according to a second frame transmitted by the transmitter; and
transmitting the third power level to the transmitter.

18. The method of claim 17, wherein the second power level is equal to the third power level.

19. The method of claim 17, wherein determining the third power level according to the second frame transmitted by the transmitter comprises:
determining the third power level according to the second frame based on a performance criterion.

20. The method of claim 19, wherein the performance criterion is optimization of throughput of the receiver.

21. A receiver, comprising: a storage unit that stores a program code;
a processing means for executing the program code for performing the method of claim 15;
a communication interface unit for receiving the first frame.

* * * * *